Patented Aug. 29, 1933

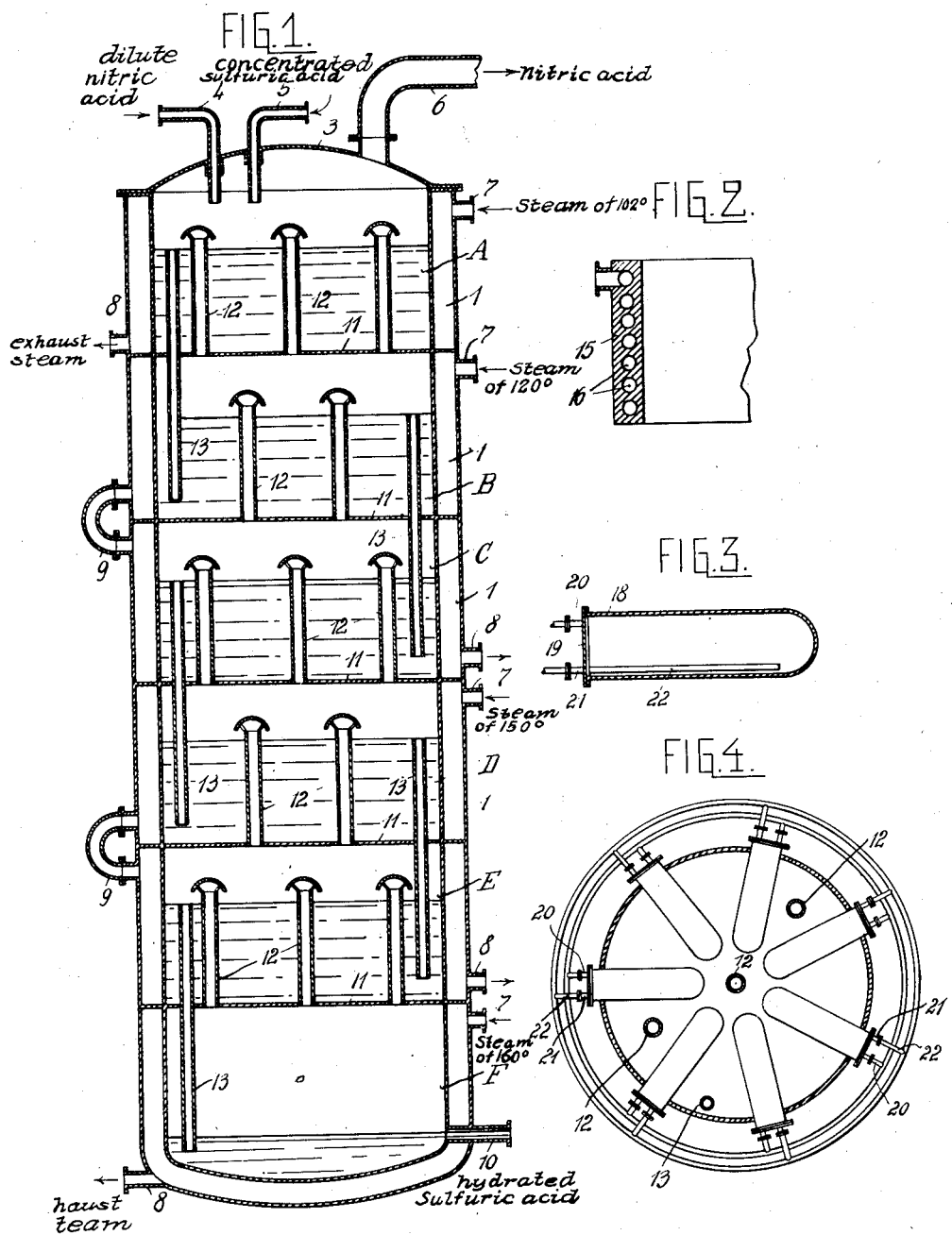

1,924,312

UNITED STATES PATENT OFFICE 1,924,312

METHOD OF CONCENTRATING NITRIC ACID

Hermann Frischer, Cologne-Lindenthal, Germany

Original application November 30, 1927, Serial No. 236,705, and in Germany December 6, 1926. Divided and this application July 30, 1929. Serial No. 382,110

2 Claims. (Cl. 23—160)

My invention refers to the concentration of dilute nitric acid, more especially by means of dehydrating media such as for instance concentrated sulfuric acid.

This application is a division of application Number 236,705 filed under date of November 30, 1927.

It is an object of my invention to provide means whereby such concentration can be carried through at less cost and a purer product of higher concentration can be obtained than was hitherto possible.

In the production of concentrated nitric acid it is of prime importance to extract from the dilute nitric acid the greatest possible quantities of acid of the highest concentration with the least possible expenditure of the dehydrating agent (e. g. sulfuric acid). Hitherto such concentration has been practiced in columns, into which steam was introduced in direct contact with the dehydrating medium. The absorption of water from the steam rendered it necessary to provide for greater quantities of such media than would be required for the concentration of the nitric acid alone. All attempts to obviate this drawback by expelling the nitric acid from its mixture with sulfuric acid by indirect heating proved a failure in view of far-reaching decompositions taking place, which lead to the formation of lower oxides of nitrogen and to great losses of nitric acid.

According to the present invention the dilute nitric acid is concentrated by indirect heating in the presence of a dehydrating medium (sulfuric acid), however, contrary to the unsuccessful attempts mentioned above the concentration is carried through in several steps distinguished by the temperature of heating, the fresh dilute acid solution being exposed to a comparatively low temperature, while in the next following step it is heated to a higher temperature, and so on, until in the last step the mixture of sulfuric acid and the last traces of nitric acid are heated to the highest temperature. In this manner I succeed in obtaining the highest possible yield of nitric acid of highest concentration without suffering any losses by decomposition. At the same time a great part of the dehydrating medium (sulfuric acid) hitherto required is saved.

While in operating with direct heating by introducing steam into the column about 2.5 tons of concentrated sulfuric acid containing from 95–97% $H_2SO_4$ were required per ton of dilute nitric acid of about 36° Bé., I succeed in concentrating the same quantity of nitric acid with not more than 1.3–1.5 tons sulfuric acid.

I prefer operating this process in columns which are subdivided in sections corresponding to the several steps or stages of heating, these sections being heated singly or in groups of two or three and indirectly with heated liquids or steam of different temperature and pressure, the conditions of heating being so chosen that the section containing the fresh dilute acid is heated to the lowest, the last section to the highest temperature.

I have further found that it is advantageous to charge the single sections with greater quantities of acid mixture than was hitherto done, as in so doing I obtain a more uniform concentration of the nitric acid and a more perfect denitration of the sulfuric acid.

The new process according to this invention has proved particularly useful for the recovery of nitric acid from denitration acid.

In the drawing affixed to this specification and forming part thereof is shown diagrammatically by way of example an apparatus embodying my invention. In the drawing Fig. 1 is a vertical section of the column built up from annular sections, while Fig. 2 is a similar view of part of a section provided with a different heating system.

Figs. 3 and 4 are a partial sectional view and a plan view, respectively, of a third modification of heating means.

Referring first to Fig. 1, A, B, C, D, E, are the superposed annular sections forming the column together with the bottom section F having the form of a kettle. Each section is formed with double walls forming a heating jacket 1. The top section is surmounted by the cover 3 having inlet pipes 4 and 5 for the dilute nitric acid and the concentrated sulfuric acid, the nitric acid vapours escaping through the exhaust tube 6. Flanged sockets 7 are provided on the heating jackets for the introduction of steam, sockets 8 for the exhaust of steam or condensate. The heating jackets of sections B and C are connected by bends 9, and so are the jackets of sections D and E. To the bottom of section F is fitted a tap socket 10 for the hydrated sulfuric acid freed from nitric acid. The sections are separated from each other by intermediate plates 11 forming partitions on which are mounted vapour tubes 12 for the passage of nitric acid vapour expelled from the mixture of nitric acid and sulfuric acid. Overflow tubes 13 lead from the upper to the lower sections, these tubes being so arranged that a large body of acid mixture is maintained in each section.

Top section A may for instance be heated with steam of 102° C. introduced into the jacket. Combined sections B and C may be heated with steam of 2.5 atms. having a temperature of about 120° C., sections D and E with steam of 5 atms. and 145–150° C. Bottom section F may be heated to about 160° C. with steam of 6–8 atms. pressure. The fresh dilute nitric acid solution entering through pipe 4 and mixing with the concentrated sulfuric acid introduced through pipe 5 is freed from the greater part of the nitric acid in the top section which is heated slightly above 100° C. Obviously at this temperature no overheating and no decomposition can occur. When the mixture in this section has reached the top end of the overflow tube 13, some of the mixture will flow down into section B, to be heated there to a higher temperature, whereby part of the nitric acid therein contained is expelled and rising through the vapour tubes 12 in the form of vapour will escape through exhaust tube 6. The same development of nitric acid vapours will take place in the lower sections, the temperature in which is adapted to the decrease of nitric acid contained in the mixture, until the residual nitric acid is expelled from the dilute sulfuric acid in the bottom section at a comparatively high temperature.

Various means may be provided for heating the several sections. The double-walled jackets may for instance be replaced by cast walls 15 (Fig. 2) in which are formed or embedded steam coils 16.

I may, however, also arrange a number of radial heating elements in each section, such element, as shown in Figs. 3 and 4, consisting of a flanged tube 18 closed at its inner end, a cover 19 being mounted on the flanged outer end, said cover being provided with sockets 20, 21 for the introduction of a steam pipe 22 and for the escape of the steam, respectively.

Various changes may be made in the details disclosed in the foregoing specification without departing from the invention or sacrificing the advantages thereof.

I claim:—

1. In the concentration of nitric acid, the process which comprises passing a liquid mixture of nitric acid and sulfuric acid through a series of separated zones containing bodies of said liquid mixture heated indirectly, with prevention of local superheating, to successively higher temperatures, said temperatures being sufficient to cause disengagement of nitric acid vapors but insufficient to cause decomposition of nitric acid, and passing substantially all the vapors of nitric acid thereby liberated through said zones in a direction counter to the flow of said mixture, thereby recovering substantially the entire nitric acid content of said mixture in the form of concentrated nitric acid.

2. The process of claim 1 wherein the first zone into which nitric acid is introduced is maintained at a temperature in the neighborhood of slightly above 100° C. and the last zone is maintained at a temperature of about 160° C.

HERMANN FRISCHER.